United States Patent
Weldemariam et al.

(10) Patent No.: US 10,743,104 B1
(45) Date of Patent: Aug. 11, 2020

(54) COGNITIVE VOLUME AND SPEECH FREQUENCY LEVELS ADJUSTMENT

(71) Applicant: International Business Machines Corporation, Armonk, NY (US)

(72) Inventors: Komminist Weldemariam, Nairobi (KE); Abdigani Diriye, Nairobi (KE); Michael S. Gordon, Yorktown Heights, NY (US); Heike E. Riel, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/777,178

(22) Filed: Jan. 30, 2020

Related U.S. Application Data

(63) Continuation of application No. 16/398,968, filed on Apr. 30, 2019.

(51) Int. Cl.
*H04R 3/04* (2006.01)
*G10L 15/183* (2013.01)
*G10L 15/06* (2013.01)

(52) U.S. Cl.
CPC .............. *H04R 3/04* (2013.01); *G10L 15/063* (2013.01); *G10L 15/183* (2013.01); *G10L 2015/0638* (2013.01); *H04R 2430/01* (2013.01)

(58) Field of Classification Search
None
See application file for complete search history.

(56) References Cited

U.S. PATENT DOCUMENTS

| | | | |
|---|---|---|---|
| 8,612,211 B1 * | 12/2013 | Shires | G10L 15/26 704/9 |
| 10,237,081 B1 | 3/2019 | Narayanaswamy | |
| 10,249,320 B2 | 4/2019 | Aaron et al. | |
| 2016/0295539 A1 | 10/2016 | Atti et al. | |
| 2019/0052690 A1 | 2/2019 | Thapa | |
| 2019/0311718 A1 * | 10/2019 | Huber | G06F 3/013 |

OTHER PUBLICATIONS

Mel, et al. "The NIST Definition of Cloud Computing". Recommendations of the National Institute of Standards and Technology. Nov. 16, 2015.
United States Notice of Allowance dated Jan. 6, 2020, in U.S. Appl. No. 16/398,968.

* cited by examiner

*Primary Examiner* — Paul W Huber
(74) *Attorney, Agent, or Firm* — Shimon Benjamin, Esq.; McGinn IP Law Group, PLLC

(57) ABSTRACT

A volume and speech frequency level adjustment method, system, and computer program product include learning a characteristic of at least one of audio volume and speech frequency from a conversation, detecting a contextual characteristic of an ongoing conversation and an interaction of a user with a device, determining a cognitive state of the user in relation to the ongoing conversation as a function of at least one of the contextual characteristic of the volume or the speech frequency, and a user interaction pattern with a conversation device, and dynamically adjusting audio levels of the ongoing conversation for the user based on the function.

4 Claims, 8 Drawing Sheets

100

FIG. 5

COGNITIVE VOLUME AND SPEECH FREQUENCY LEVELS ADJUSTMENT

CROSS-REFERENCE TO RELATED APPLICATIONS

The present application is a Continuation Application of U.S. patent application Ser. No. 16/398,968, the entire contents of which are hereby incorporated by reference.

BACKGROUND

The present invention relates generally to a volume and speech frequency level adjustment method, and more particularly, but not by way of limitation, to a system, method, and computer program product for intelligently adjusting the volume and frequency of a user engaged in an audio/video meeting or conference conversation.

In a teleconference and/or videoconference conversation involving multiple parties, different people speak with different voice volume levels and it tends to vary with their mood, topic of an agenda, contextual situation and cognitive characteristics. In such a conversation using teleconferences and/or videoconferences, the user's mood, cognitive state and behaviour or contextual situation may evolve during the course of the entire conversation. For example, the user may become excited, stressed, enlightened, sad (e.g., not able to hear clearly a particular snapshot of the conversation), etc. by the topic, subtopic, results mentioned in the conversation, as well as the nature and characteristics of the conversation, and speaker, telecommunication device. Moreover, sometimes the conversation needs a stimulus to encourage useful (and educational and enjoyable) interactions and engagements.

Conventionally, the ability to automatically adjust voice volume levels has been considered such as a using loudspeaker that automatically adjusts the volume for each speaker on the other end at the same volume level.

SUMMARY

However, the inventors have identified a problem in the art that the art does not consider analyzing the speaker(s) volume and frequency patterns associated with the mood and conversation context (e.g., project, client, personal, call center, etc.) and characteristics (e.g., stressful, intense) for the participants of the conversation, dynamically updating a database of the user(s) voice levels based on cognitive feedback and contextual situation, automatically adjusting the frequency and volume patterns based on dynamically learnt user(s) preferences and the cognitive state of the respective users, and adjusting the volume and speech frequency pattern dynamically by predicting an importance of the topic and the level of engagement of the users. Based on the newly-identified problem, the inventors propose a new solution below.

In an exemplary embodiment, the present invention provides a computer-implemented volume and speech frequency level adjustment method, the method including learning a preferred level and a characteristic of at least one of volume and speech frequency from a historical conference conversation, detecting a contextual characteristic of an ongoing conversation and an interaction of a user with an electronic device, determining a cognitive state and a contextual situation of the user in relation to the ongoing conversation as a function of at least one of the contextual characteristic, a preferred level and characteristics of the volume or the speech frequency, and the interaction, determining at least one factor to trigger an audio level modulation based on the function, and dynamically adjusting audio levels of the ongoing conversation for the user based on the at least one factor.

One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 5 exemplarily depicts flows a graphical user interface (GUI) voice feedback recommendation according to an embodiment of the present invention;

DETAILED DESCRIPTION

Figure 1:
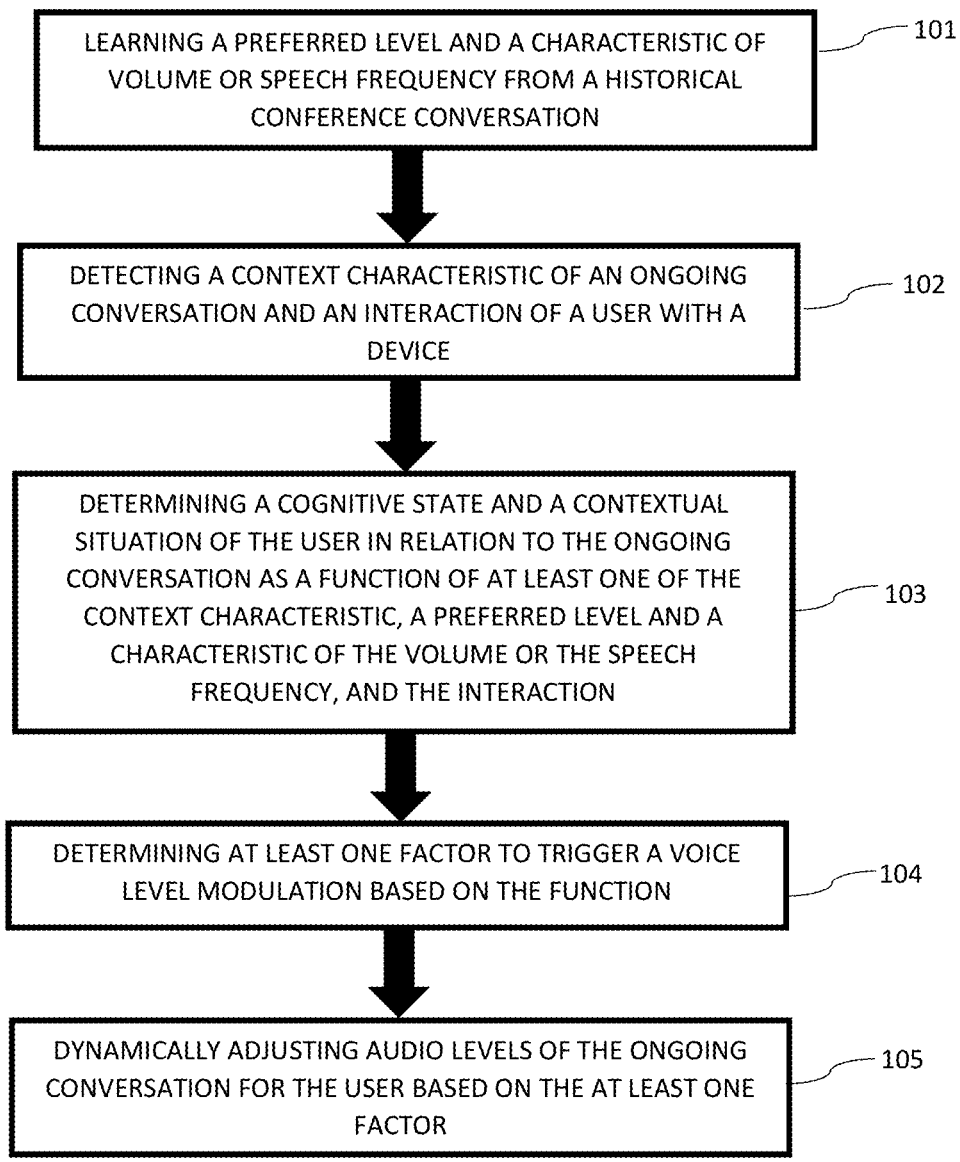
FIGS. 1-3 exemplarily show a high-level flow chart for volume and speech frequency level adjustment methods 100, 200, and 300 according to an embodiment of the present invention.

The invention will now be described with reference to FIGS. 1-8, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a volume and speech frequency level adjustment method 100 according to the present invention can include various steps for learning a user's preferred levels and characteristics of at least one of volume and speech frequency from historical audio/video meeting or conference conversations, detecting the context (e.g., project, client, personal), characteristics (e.g., stressful, intense, importance) of an ongoing conversation and interaction of the user with one or more devices (e.g., adjusting earphone, increasing volume, etc.), determining the cognitive state (e.g., mood, agitated, excited, sad) and contextual situation of the user in relation to the ongoing conversation and/or topic of conversation as a function-of (context, characteristics, interactions), determining at least one factor to trigger a voice level modulation, and, then dynamically adjusting the voice levels for the user based on the at least one factor.

Figure 6:
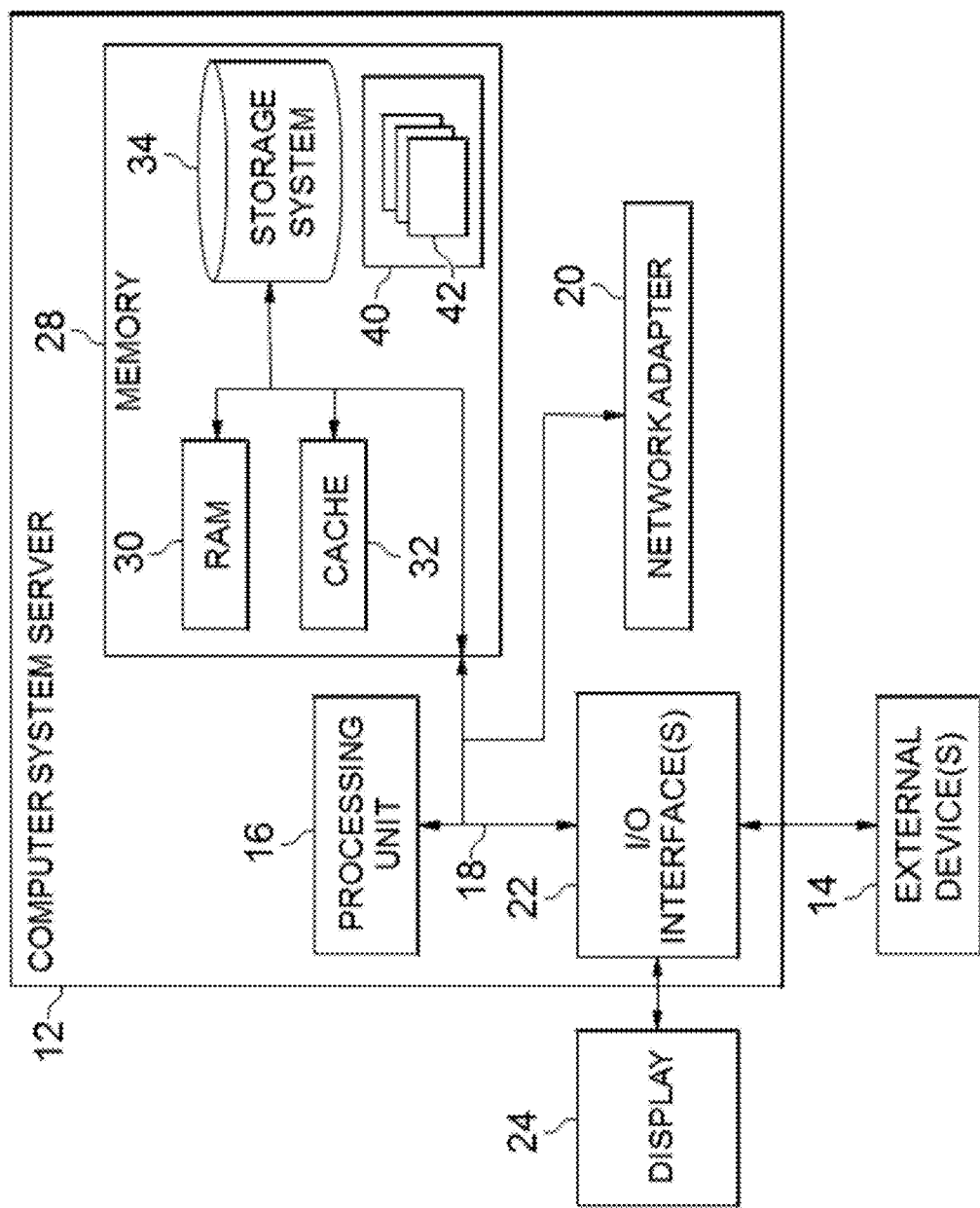
FIG. 6 depicts a cloud-computing node 10 according to an embodiment of the present invention.

By way of introduction of the example depicted in FIG. 6, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 8), it is nonetheless understood that the present invention can be implemented outside of the cloud environment.

With reference generally to method 100, the method may receive and analyze data from miscellaneous data sources (e.g., volume adjustment data) including historical volume data of voice levels of a given person (speaker), historical audio/video meeting or conference calls, user feedback, user profiles, data from sensors of conversation devices, including historical interactions of a user with a device, historical communication devices, previously learned cognitive states of users, previously used adjustment factors and strategies, and real-time analysis instrumented data obtained by the user device. The method may also receive and analyze data from an electronic calendar describing, for example, the meeting topic, the meeting agenda, prior topics discussed, duration of the meeting, appointment, etc. The volume adjustment data may be stored locally (on the user device such as a cell phone, telephone or a communication network) or on remotely hosted databases (e.g., on a cloud network).

The method may further determine the conversation context (e.g., a project, a client meeting, a family member, a personal call, a call center conversation, etc.) and characteristics of the call (e.g., a stressful call, an intense call, a casual call, etc.) associated with the first entity and second entity or multiple entities (e.g. conference call) having the conversation based on analyzing the volume adjustment data.

To illustrate the above embodiments, the following scenario between "Eric and John" where Eric calls John to discuss plans for the weekend is given as:

Engagement:
    Eric: Hey John, do you have any plans for the weekend?
    John: No plans yet, what's up?

Figure 2:
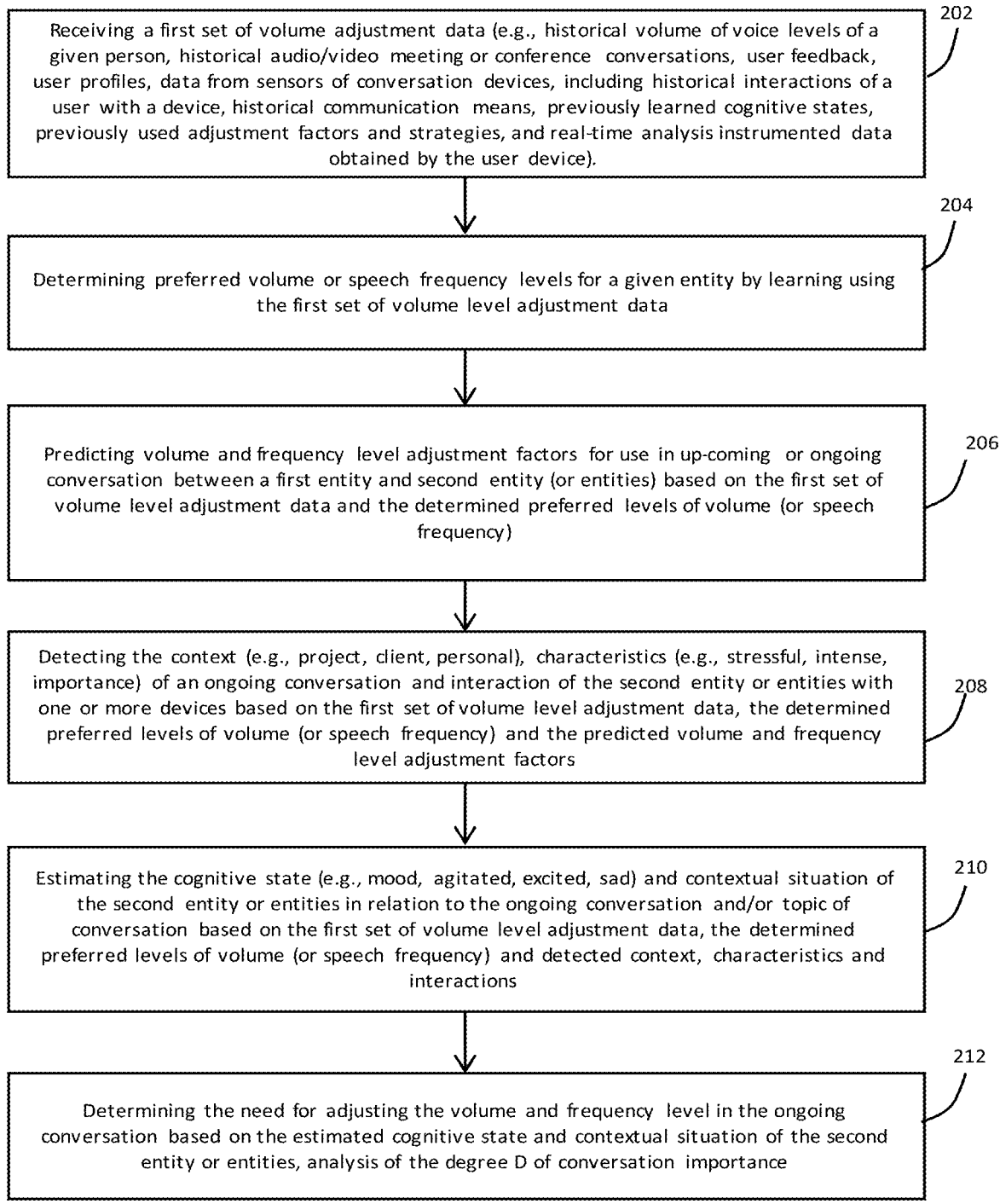
Figure 3:
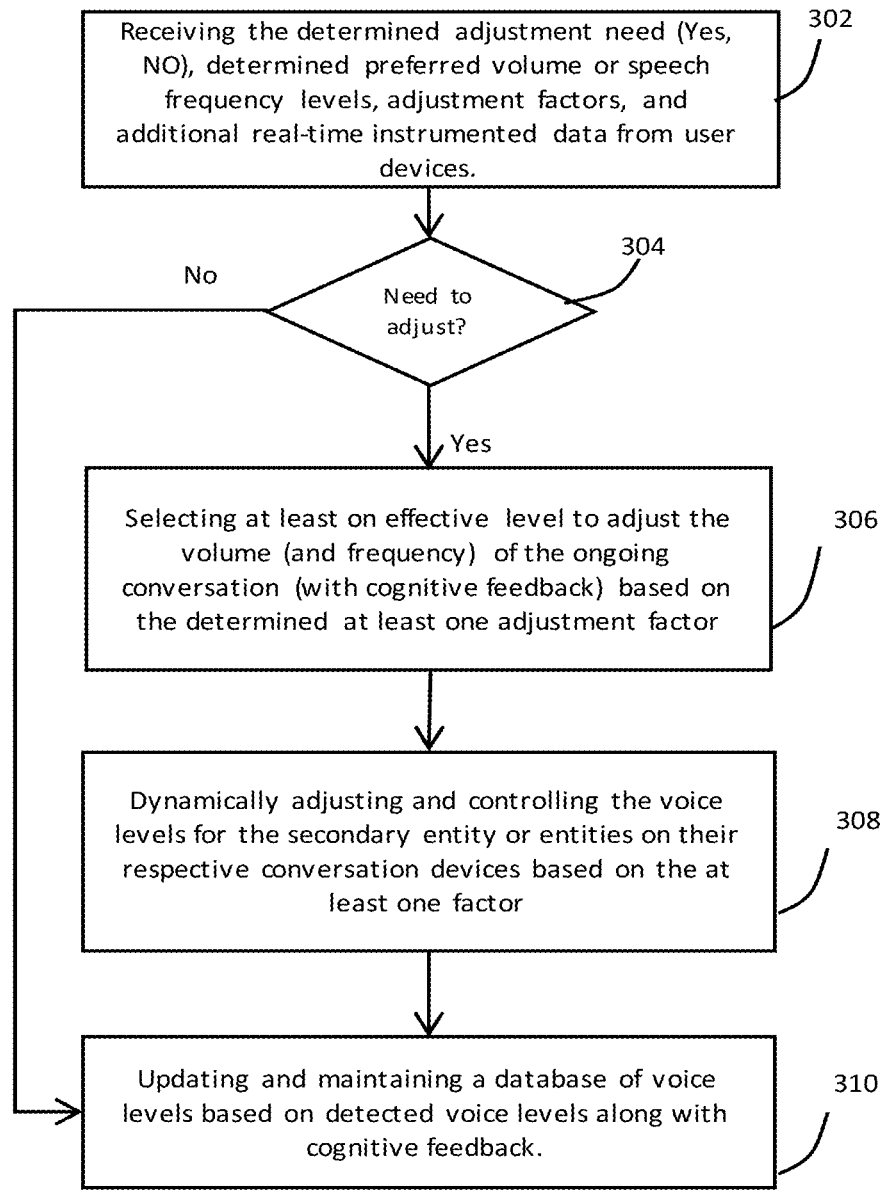
Figure 4:
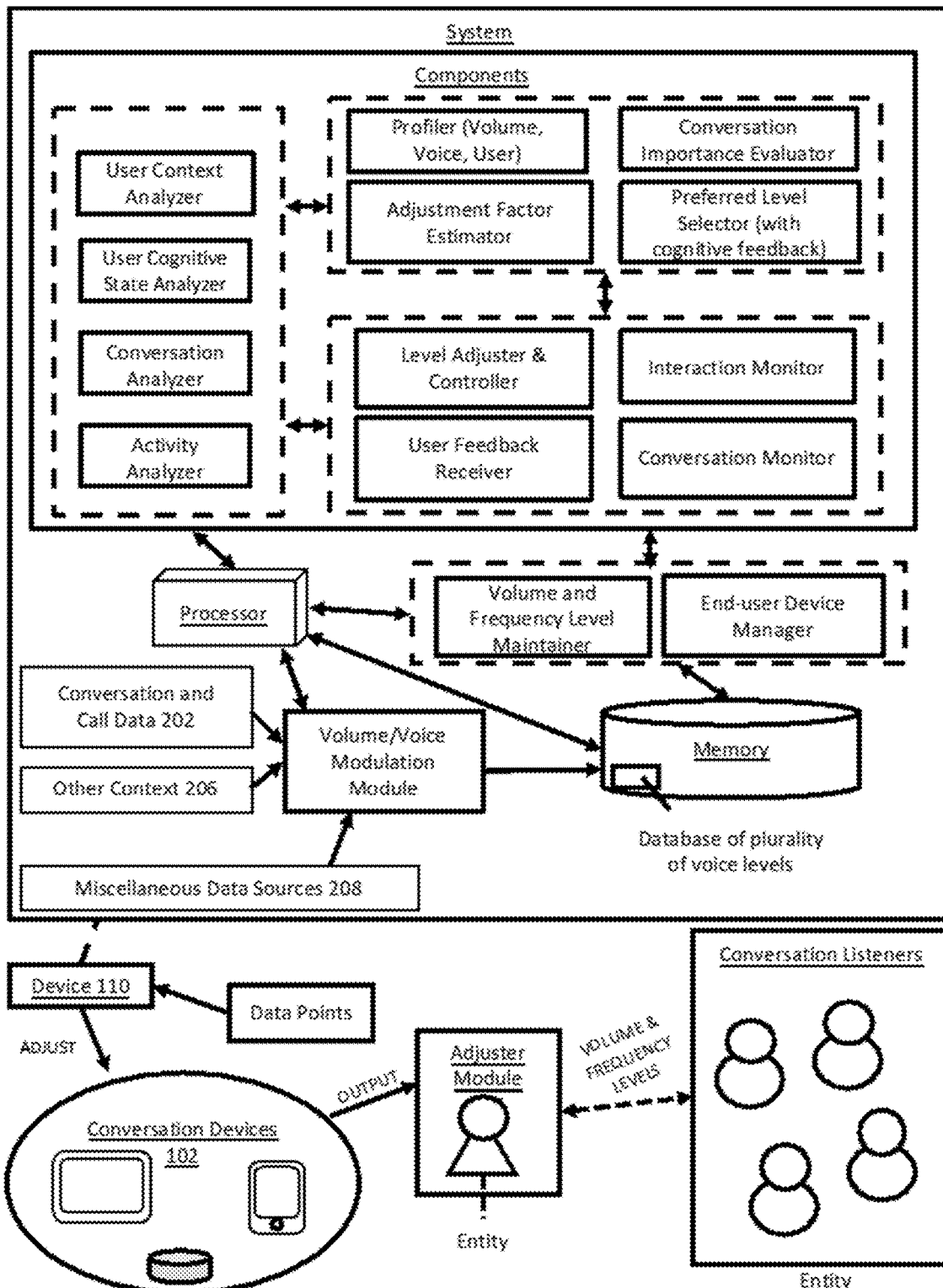
FIG. 4 exemplarily depicts a volume and speech frequency level adjustment system according to an embodiment of the present invention.

After this initial greeting, the application monitoring and instrumentation (e.g., as shown in FIGS. 2-4) may predict that Eric's excitement levels may rise based on the facial micro-expressions detected for the time period and trains itself to note the threshold of volume and pitch variation for the next time period between $T_i$ to $T_j$, where $i<j$.

Response:
    Eric: (with dilated pupils and excitement): (Loudness in voice) I have two tickets for Broadway show in NYC!!!

Through analysis of the conversation, the system as shown in FIG. 4 may correlate the detected excitement with the context of the conversation and the person on the receiver end.

Response:
    John: John immediately shows cringing expressions due to the frequency and loudness of Eric's voice and he presses the volume down button instantly in response.

The conversation analyzer may further detect John's immediate response, store it in the feedback detection system (volume down press) and an interaction monitor (e.g., using a camera) module detects the facial micro-expressions and mood in conjunction with the contextual situation and history of calls between Eric and John.

The system may progressively maintain a plurality of voice levels that may contain behavior, level of engagement, contextual situation and cognitive states of the users.

For example, historic volume adjustment data may show Eric exhibiting persistent high (or excited) sentiment/emotion based on the contextual situation that causes listeners like John to reduce the volume.

Based on the above analysis, the invention may predict the user's (i.e., in this case John's) response (e.g., lowering the volume level) based on the conversation and history of engagement, estimate and find a segment in the conversation to increase or reduce the voice and pitch levels based on implicit/explicit learning feedback (once it has detected the response on either end), and dynamically reduces the volume and pitch based on the prediction on the receiver end in response to conversations with Eric.

The same technique may be used to detect John's response and predict that John may exhibit high levels of excitement measured via external sensors, a camera module, wearable devices, etc. and determines Eric's feedback response in order to take a similar action on the first entity's behalf.

In an alternate scenario, John might have replied: "speak slowly Eric, I can't hear you, you're going too fast and calm down." The invention may have monitored John's response based on natural language processing (NLP), Mel-frequency cepstral coefficients (MFCCs) and semantic conversation detection in conjunction with John's expressions and action taken (if needed) and reduced the frequency (slow down the playback of Eric's speech) and volume of the speaker automatically (i.e., in real time). The same action may be taken on Eric's end if John performs or exhibits similar actions based on Eric's dynamically trained/learnt preferences.

In another scenario, a conference call can include multiple parties. In the call, one user may be walking in a noisy city and is communicating via a Bluetooth headset. The other parties on the call are having a difficult time hearing him over the background noise. They turn up the volume on their phones, but the background noise intensifies at the same time making it even more difficult to distinguish his voice from the background.

Analysis of the facial expressions of the other users would show a reaction to the loud background noise and the inability to clearly hear the speaker. The conversation analyzer would store these data and attempt to provide an adequate filter to reduce the background noise levels.

The system may record volume levels and speech frequency, or levels that the system has been programmed to record and may try to adjust such levels with cognitive feedback and visual indicators on a user device (e.g. green light by a mobile device when the volume is turned up too loud). If necessary, later, the system may replay conversation at new volume levels and describe the context related to the levels and the reasons for the action(s) it took. As an example, the system might record the level (e.g., low) of volume of a voice and second entity cognitive state (e.g., irritated) when a primary entity is talking, and the volume level is raised (approximately after 6 seconds). As a further example, if the user is speaking very quickly, then the system may play the recording back at a somewhat "slower rate" to which a user is comfortable with. In one embodiment, the "slower rate" is determined by analyzing historically preferred playback speeds. This could be especially useful for a conversation in a foreign language if one of the users in the conference call is not a native speaker of that language so that the conversations occur at a slower speed.

In one embodiment, pre-call feedback can be generated. In the case of a scheduled call—in the event there is an invitation sent or scheduled—the system may provide the user(s) feedback on the characteristics of the participants and recommendations about the desired volume, tone, etc. to ensure a successful conference call. This is computed via historic analysis of the speaker(s) volume and frequency patterns associated with the mood and conversation context (e.g., project, client, personal, call center, etc.) and characteristics (e.g., stressful, intense, etc.) for the participants of the conversation, and access this via the database entries of the user(s) voice levels based on cognitive feedback and contextual situation. This data is then relayed and sent to their mail client, scheduling tool, conference call system, etc.

An example scenario for the above is as follows: Eric schedules a call with his manager Luigi and his head of department Mario. Upon entering their e-mail addresses into the email client, the invention retrieves from the database the meeting attendee's historic voice levels based on cognitive feedback and contextual situation, and from this the system creates recommendations and preferences given the list of meeting attendees. An example of the call and attendee summaries providing the user who is scheduling the call important information on how to best communicate with the call participants is shown by this GUI in FIG. 5.

By the same token, the system could make an "one-the-fly" assessment of the participants by having them introduce themselves when they call/sign in and have them say a few words.

Figure 5:
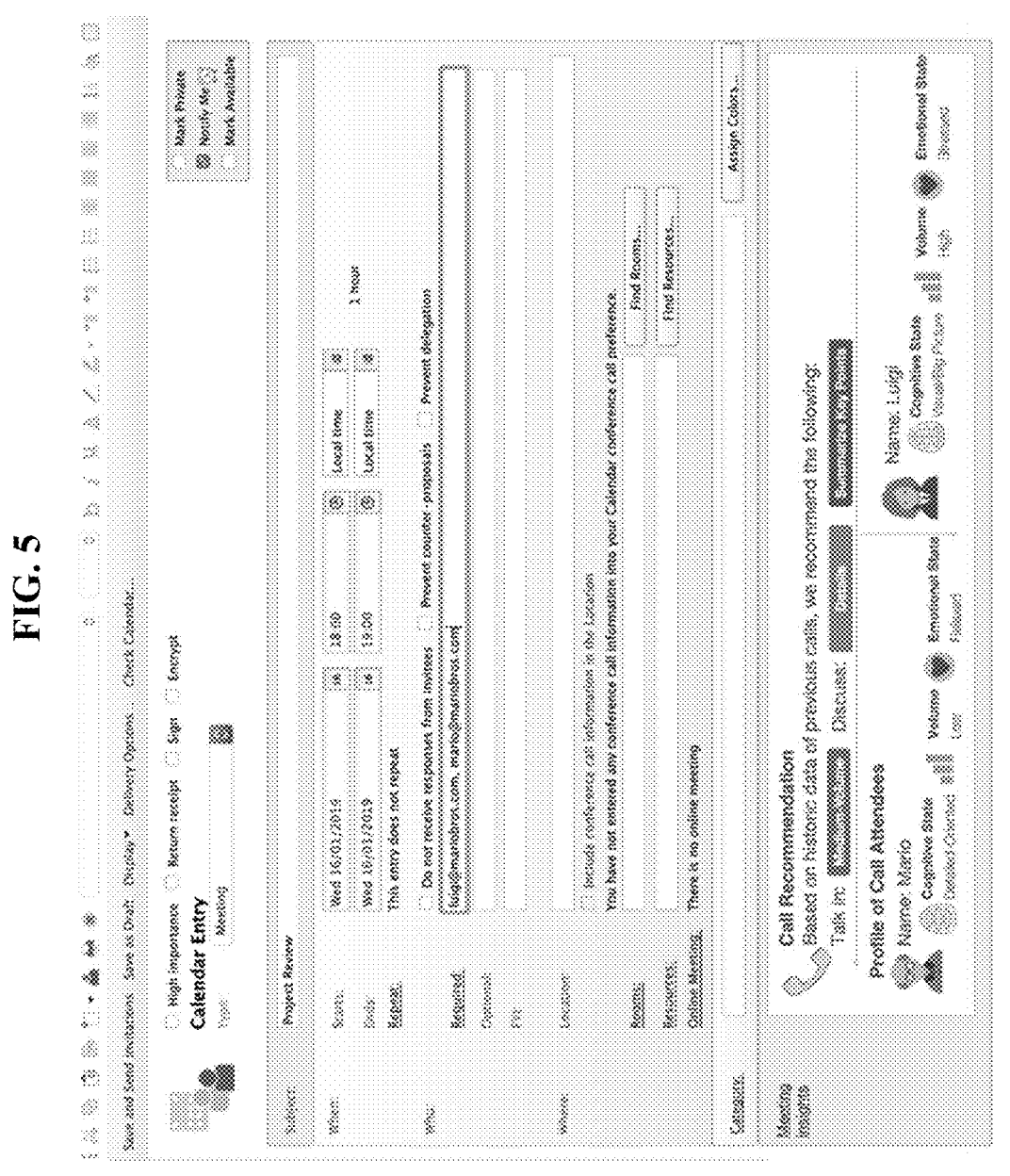

That is, FIG. 5 exemplarily depicts an example of a GUI voice feedback recommendation. FIG. 5 depicts computed of historically-generated profiles of the attendees. There is an entry for each attendee and the invention finds information about their cognitive state, preferred volume, emotional state, etc. This is intended to provide foresight to the user(s) on how to best communicate. There is also a summary feature that shows the recommended tone, volume, etc. in which to communicate. This is computed by converting the attributes into nominal data and determining the average of a given attribute (e.g., $V_{if}$ users have historic volume set to: medium, high, medium; then the system would summarize the ideal volume as medium-high). The most frequent attributes are also summarized.

With reference generally to FIGS. 2-3, in some implementation steps, the user identifier is constructed. The identifier may be in the form of the user's name and identification number and is stored in a cloud database. For example, individuals who work for a company or in a certain group engaged in a teleconference can have their voice snippets stored in conjunction with their identifier. Once the user identifier and voice snippet are associated, each user can be identified on the conference call at any point of time and their identify can respectively be recognized. When the users start or join-in to an existing conference call, their speech features may be mapped to their respective identifiers and feature matching can be performed via a Gaussian or student-T mixture model.

The system may communicate with other linked devices (e.g., desktop telephone, user's laptop, mobile, wearable devices, etc.) to further monitor the news/events (e.g., from social media networks) to capture the information which the specific users follow and accordingly develop the rigidity factor to keep in account relevant topics of interest (e.g., work life or personal). This method would also allow for having user defined relevant topics so that very new topics could be added where it takes time for the method to learn new relevant topics.

The method may determine call or conversation importance through caller relationship understanding by employing custom designed machine learning models or algorithms that may predict or estimate the "importance" of ongoing discussions or part of the conversation. For instance, during the workday, a conversation between an employee and his manager or team of coworkers might be deemed more important than a conversation with a daycare center, however during certain circumstances the conversation with the daycare center might be more important (i.e. during an emergency). A broader set of statistical machine techniques that might be applied to determine the call or conversational importance, for example, by regression analysis, principal component analysis, singular value decomposition, deep learning, long-short term memory based sequence learning, etc.

By way of an example, the method of caller relation understanding may use machine learning models (e.g., cohort analysis models) to understand the relationship of the first entity and second entity or a group of second entities (e.g., conference all conversation receivers) engaged in the call or conversation. The models may be varied via input features inclusive of tone, language, time, content and the calling number/name (if stored in user's mobile device). Principal component analysis for dimensionality reduction may be applied in order to simplify the model and use the various sources of detection and compute the relationship of the users via graphical analysis.

Through a dynamic conversation analysis module, the importance of a conversation may be detected or predicted based on the content, calling information, identification of the "focus" of the conversation, correlating the identified "focus" with historical conversation data, contextual situation and semantic analysis of the conversation occurring during the call. The method may take into account multiple input features including content analysis which is detected via speech analysis by Mel Frequency cepstral coefficients, calendar entry, and information from historical conversations if the meeting is ongoing or periodic (e.g., weekly conference calls, etc.). If the information retrieved from the regression models is insufficient to feed to the classification model and determine the importance, then MFCC feature extraction and feature matching is used for mapping the extracted speech features with the users identified on the other side of the call and the historical analysis chart can compute if a conversation has occurred with the relative party. If the user has had the conversation with the other user identified via MFCC speaker identification model, then the information is complete can be fed to an importance classification.

Along with speaker identification via variant of Gaussian or multivariate Student-t mixture models, other input parameters including of contextual situation, including of agenda of discussion, meetings, level of engagement with the user (in order to define the relationship of the user's engaged in the conversation as predicted from the above mentioned regression model) are fed to a multi-level neural networks learning algorithm in order to classify the level of importance of the conversation in multiple levels of thresholds which can be user-configurable or dynamically learnt by historical analysis of previous conversations and contextual situation.

The method may store analyzed conversation(s) for referencing using custom-trained NLP for extracting and storing relevant topics of conversation in a cloud database which is integrated with the respective users who are engaged in that specific topic of interest. Using the MFCC for Speech—Speech features extraction and feature matching recognizes who is speaking at a point in time and to whom might be being referred.

The invention also includes a cognitive learning feedback. Using the above information, a confidence level can be estimated based on mentioned features, and tags are created with respect to the specific user and their voices so that the relevance can be established. The invention may perform a speech expression analysis against content fields for matching certain patterns that typically include user information and the user's content. This can also be more domain-specific if the user usually works in a specific domain. The invention may further perform a correlation of the terms typically used in association with the regular expression match and if found the content can be designated as a "match".

This analysis may further be accomplished through statistical algorithms (e.g., clustering, classification, correlations, etc.), and may include performing an analysis of the terms and words in the initial information for terms that are deemed correlated to a specific user from a matching repository; clustering and classification methods are used to extract contextual or audio based conversation information features, index the feature space, and classify individual's information and other pieces of information into semantic categories, a weighted variation of Euclidean distance can be used for the phrase comparison of all components in the feature vector with equal weightings and has a low computational complexity. Hence, a content and user relevance is established using the pattern history of the user and monitoring the response of the user with respect to the specific parts of the conversation while the user is engaged in the conference call. Also, once the content relevance has been detected with respect to the specific user, the system detects who the speaker and listeners are, dynamically, and adjusts the volume at the same time with respect to users' dynamically-learned preferences.

With reference back to FIG. 1, in step 101, a preferred level and a characteristic of at least one of volume and speech frequency can be learned from a historical conference conversation (or potentially "one the fly" from a user calling in or introducing themselves).

In step 102, a context characteristic of an ongoing conversation and an interaction of a user with a device are detected.

In step 103, a cognitive state and a contextual situation of the user or series of users are determined in relation to the ongoing conversation as a function of at least one of the context characteristic, a preferred level and a characteristic of the volume or the speech frequency, and the interaction.

In step 104, at least one factor to trigger a voice level modulation based on the function is determined.

And, in step 105, dynamically adjusting audio levels (e.g., voice, background, pitch, filter, speed, audio characteristics, etc.) of the ongoing conversation for the user based on at least one factor.

The at least one factor may include adjusting the volume, adjusting the pitch, adding filtering, tone of the speech, comfortable rate level (slower, faster, variable, e.g., high on some topics that are deemed to be a high interest for a user), frequency level, etc.

In one embodiment, the invention includes receiving, analyzing and storing a plurality of volume adjustment data sources including historical volume of voice levels of a given person, historical audio/video meeting or conference conversations, user feedback, user profiles, data from sensors of conversation devices, including historical interactions of a user with a device, historical communication means, previously learned cognitive states, previously used adjustment factors and strategies, real-time analysis instrumented data obtained by the user device, electronic calendar, etc. And, the method includes creating and progressively updating and maintaining a database of voice levels with cognitive feedback for a plurality of users.

In another embodiment, the invention includes predicting preferred volume and frequency level adjustment factors to be used in up-coming or ongoing conversation between a first entity or entities and second entity (or entities). And, the voice levels can be further adjusted with cognitive feedback and indicating the adjustment using a visual indicator on a user device (e.g. green light by a mobile device when the volume is up) or stored in a database for later retrieval.

In one embodiment, the invention includes estimating the importance of the call or conversation based on analysis of the content of conversation, identifying the "focus" of the conversation, correlating the identified "focus" with historical conversation data, contextual situation and semantic analysis of the conversation occurring during the call or conversation, etc. In other words, the volume of the call can be adjusted to emphasize the focus of the call. Alternatively, the voice levels can be adjusted with the cognitive feedback.

And, as mentioned above, the frequency or speech speed may be adjusted (i.e., faster, slower, etc.) as a result of cognitive feedback analysis.

The invention can further output attributes or characteristics of other users and may be summarized at the user and group level. And, summaries and insights of user call attendees can be inserted into email clients and other meeting scheduling platforms.

In one embodiment, the invention can detect if the user already has a volume assistance device (such as a hearing aid) such that the invention does not "double amplify" the volume.

Thereby, the invention includes a practical application in at least a modification of the audio of a conference call to improve call quality and the user's experience for each user and for the entities on the call as a whole.

Exemplary Aspects Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 6, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or more program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 7:
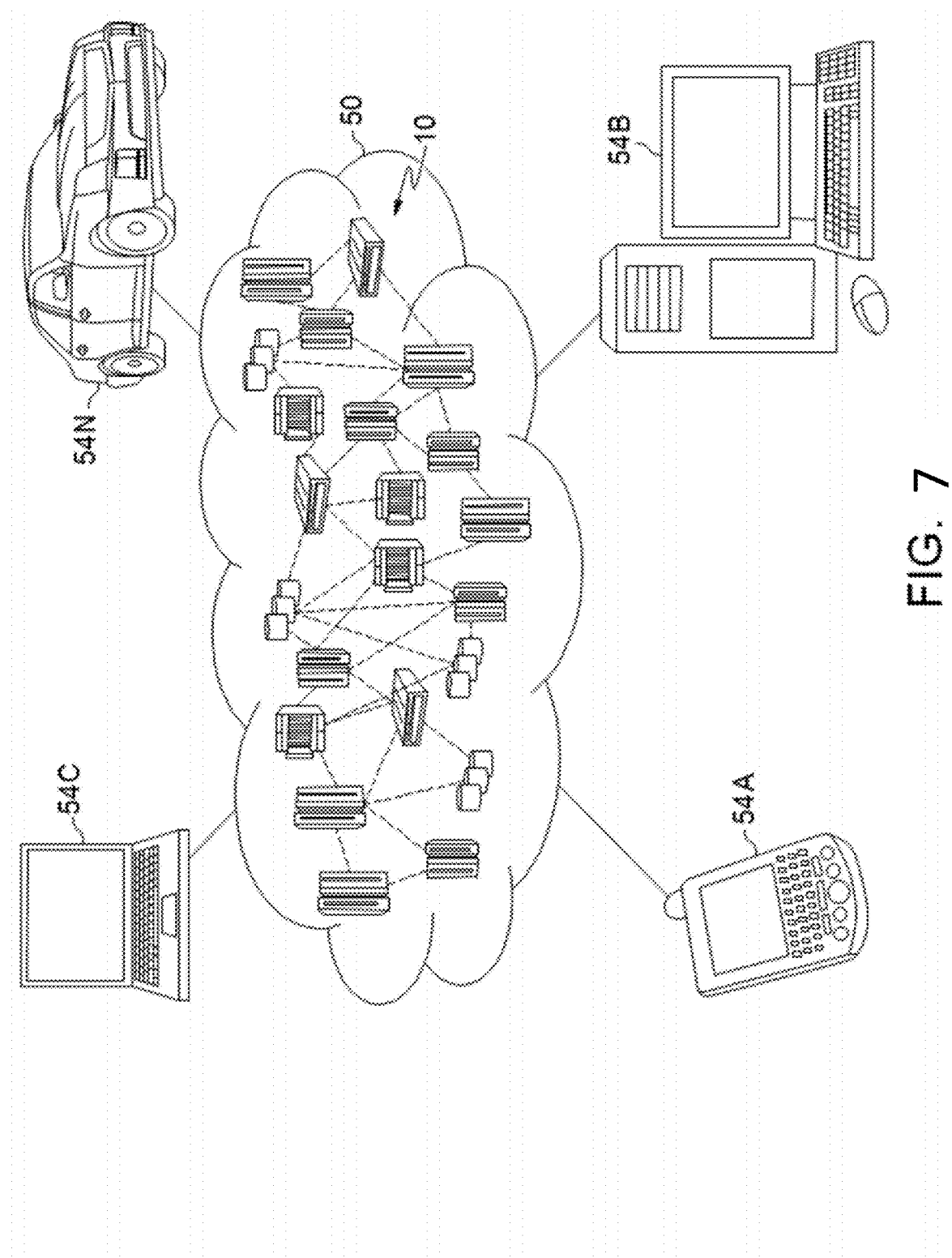
FIG. 7 depicts a cloud-computing environment 50 according to an embodiment of the present invention.

Referring now to FIG. 7, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 7 are intended to be illustrative only and that computing nodes 10 and cloud computing environment 50 can communicate with any type of computerized circuit over any type of network and/or network addressable connection (e.g., using a web browser).

Figure 8:
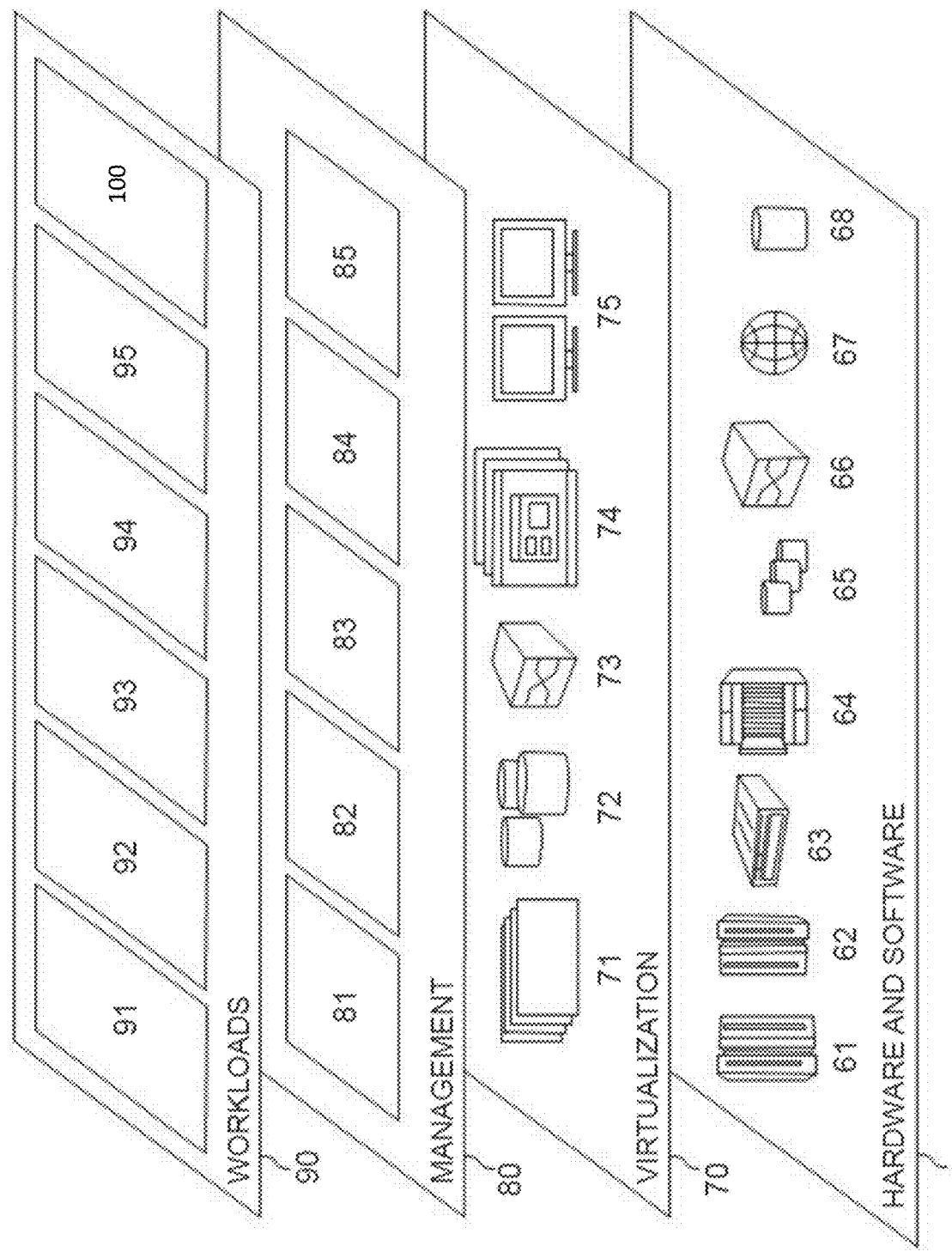
FIG. 8 depicts abstraction model layers according to an embodiment of the present invention.

Referring now to FIG. 8, an exemplary set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and volume and speech frequency level adjustment method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented volume and speech frequency level adjustment method, the method comprising:
   learning a characteristic of at least one of audio volume and speech frequency from a conversation;
   detecting a contextual characteristic of an ongoing conversation and an interaction of a user with a device;
   determining a cognitive state of the user in relation to the ongoing conversation as a function of:
      the at least one of the audio volume and the speech frequency from the conversation; and
      the contextual characteristic of the ongoing conversation and the interaction of the user with the device;
   dynamically adjusting audio levels of the ongoing conversation for the user based on the determined function; and
   creating and progressively maintaining a database of the adjusted audio levels with cognitive feedback for a plurality of users.

2. The computer-implemented volume and speech frequency level adjustment method of claim 1, further comprising predicting an audio level modulation performed by the adjusting audio levels to be used in an up-coming conversation between a first entity and a second or additional entity based on the function.

3. A computer program product for volume and speech frequency level adjustment, the computer program product comprising a computer-readable storage medium having program instructions embodied therewith, the program instructions executable by a computer to cause the computer to perform:
   learning a characteristic of at least one of audio volume and speech frequency from a conversation;
   detecting a contextual characteristic of an ongoing conversation and an interaction of a user with a device;
   determining a cognitive state of the user in relation to the ongoing conversation as a function of:
      the at least one of the audio volume and the speech frequency from the conversation; and
      the contextual characteristic of the ongoing conversation and the interaction of the user with the device;
   dynamically adjusting audio levels of the ongoing conversation for the user based on the determined function; and
   creating and progressively maintaining a database of the adjusted audio levels with cognitive feedback for a plurality of users.

4. A volume and speech frequency level adjustment system, the system comprising:
   a processor; and
   a memory, the memory storing instructions to cause the processor to perform:
      learning a characteristic of at least one of audio volume and speech frequency from a conversation;
      detecting a contextual characteristic of an ongoing conversation and an interaction of a user with a device;
      determining a cognitive state of the user in relation to the ongoing conversation as a function of:
         the at least one of the audio volume and the speech frequency from the conversation; and
         the contextual characteristic of the ongoing conversation and the interaction of the user with the device;
      dynamically adjusting audio levels of the ongoing conversation for the user based on the determined function; and
      creating and progressively maintaining a database of the adjusted audio levels with cognitive feedback for a plurality of users.

* * * * *